US011462040B2

United States Patent
Lin et al.

(10) Patent No.: US 11,462,040 B2
(45) Date of Patent: Oct. 4, 2022

(54) DISTRACTOR CLASSIFIER

(71) Applicant: ADOBE INC., San Jose, CA (US)

(72) Inventors: Zhe Lin, Bellevue, WA (US); Luis Figueroa, San Luis, AZ (US); Zhihong Ding, Davis, CA (US); Scott Cohen, Cupertino, CA (US)

(73) Assignee: ADOBE INC., San Jose, CA (US)

( * ) Notice: Subject to any disclaimer, the term of this patent is extended or adjusted under 35 U.S.C. 154(b) by 105 days.

(21) Appl. No.: 17/082,479

(22) Filed: Oct. 28, 2020

(65) Prior Publication Data
US 2022/0129670 A1    Apr. 28, 2022

(51) Int. Cl.
| | | |
|---|---|---|
| G06V 40/10 | (2022.01) | |
| G06N 3/08 | (2006.01) | |
| G06K 9/62 | (2022.01) | |
| G06T 3/40 | (2006.01) | |
| G06V 10/50 | (2022.01) | |

(52) U.S. Cl.
CPC .......... G06V 40/10 (2022.01); G06K 9/627 (2013.01); G06K 9/6256 (2013.01); G06N 3/08 (2013.01); G06T 3/40 (2013.01); G06V 10/50 (2022.01)

(58) Field of Classification Search
None
See application file for complete search history.

(56) References Cited

U.S. PATENT DOCUMENTS

| | | | |
|---|---|---|---|
| 10,460,214 B2 | 10/2019 | Lu et al. | |
| 2013/0148910 A1* | 6/2013 | Fredembach | G06T 7/11 382/275 |
| 2017/0032551 A1* | 2/2017 | Fried | G06T 7/11 |
| 2018/0165548 A1* | 6/2018 | Wang | G06N 3/084 |

OTHER PUBLICATIONS

Fried, O., Shechtman, E., Goldman, D.B., Finkelstein, A. "Finding Distractors in Images", Computer Vision and Pattern Recognition (CVPR), Jun. 2015 (CVPR), pp. 1703-1712 (Jun. 2015).

* cited by examiner

*Primary Examiner* — Leon Flores
(74) *Attorney, Agent, or Firm* — F. Chau & Associates, LLC

(57) ABSTRACT

A distractor detector includes a heatmap network and a distractor classifier. The heatmap network operates on an input image to generate a heatmap for a main subject, a heatmap for a distractor, and optionally a heatmap for the background. Each object is cropped within the input image to generate a corresponding cropped image. Regions within the heatmaps that correspond to the objects are identified, and each of the regions is cropped within each of the heatmaps to generate cropped heatmaps. The distractor classifier then operates on the cropped images and the cropped heatmaps to classify each of the objects as being either a main subject or a distractor.

19 Claims, 6 Drawing Sheets

DISTRACTOR CLASSIFIER

TECHNICAL FIELD

This disclosure relates to techniques for identifying unwanted objects in an image, and more particularly, to techniques for identifying unwanted people in an image using machine learning.

BACKGROUND

Distractors are objects or regions in images that draw attention away from the main subjects of an image. Examples of distractors include signs that are present in a photo of a landscape, the presence of an unwanted person in a portrait photo or in a landmark photo, or an incomplete portion of an object appearing at an edge of a photo.

One technique for identifying distractors and removing them from images employs a machine learning model trained on ground-truth (human annotated) images to identify distractors. The model creates a distractor map of an image that identifies the objects in an image and predicts a degree to which each object is likely a distractor. An adjustable threshold is set in some scenarios to remove those objects predicted to be distractors to a degree that exceeds the threshold.

A problem arises, however, when the model removes a person from a photo who was positioned relatively far from the camera, even though the photographer intended for the person to be in the photo. The opposite problem arises when an unwanted person close to the camera is not removed, because the model does not classify the person as a distractor.

Another technique for identifying distractors from images assumes that objects appearing in a photo at a size significantly smaller than other objects are the distractors since larger objects tend to be more salient and thus more likely to be a main subject.

A problem arises, however, when an unwanted person appears between the intended subject and the camera, thus appearing much larger. This leads to instances of wrongly identifying an unwanted person as a main subject and retaining these people in the image.

SUMMARY

Systems, methods, and software are described herein for identifying unwanted objects (e.g., human distractors) in images. A distractor classifier implemented in hardware, software, and/or firmware on one or more computing devices functions to identify the distractors within images.

An exemplary embodiment of the distractor classifier comprises a combination of two or more networks including an object detector network, a heatmap network and a hybrid classifier. The heatmap network operates on an input image to generate a heatmap (e.g., global information or global data). In an embodiment, the global data is generated from all pixels of the input image. The heatmap includes a heatmap for a main subject, a heatmap for a distractor, and optionally a heatmap for the background. The object detector identifies objects in the input image. Each of the objects is cropped within the input image to generate a corresponding cropped image (e.g., local information or local data). In an embodiment, the local data is generated from pixels of the object. Regions within the heatmaps that correspond to the objects are identified, and each of the regions is cropped within each of the heatmaps to generate cropped heatmaps. The hybrid classifier then operates on the cropped images and the cropped heatmaps to classify each of the objects as being either a main subject or a distractor.

According to an embodiment, features of an object cropped from the image are generated by an object detector network, the features including first data local to the corresponding object. Features of a cropped heatmap of the object are generated by a heatmap network, the features of the cropped heatmap include second data global to the image

BRIEF DESCRIPTION OF THE DRAWINGS

The detailed description describes embodiments with additional specificity and detail through use of the accompanying drawings, briefly described below.

DETAILED DESCRIPTION OF EXEMPLARY EMBODIMENTS

The present disclosure is directed to a classifier for identifying a distractor within an input image. In at least one embodiment, the classifier uses a neural network and machine learning to determine the presence of a distractor. The classifier considers both global information that is contained in heatmaps and local information contained in individual cropped objects to more accurately predict which of the object(s) is a distractor. The distractor can later be edited or removed from the input image to provide a corrected image that better reflects what the photographer had originally intended to capture. The distractor identified within the image can be an object such as a distracting sign or a person who is not the main subject in the image. In descriptions of embodiments of the invention that follow, a person or a human distractor is assumed, but the distractor can also be a non-human distracting object.

Figure 1:
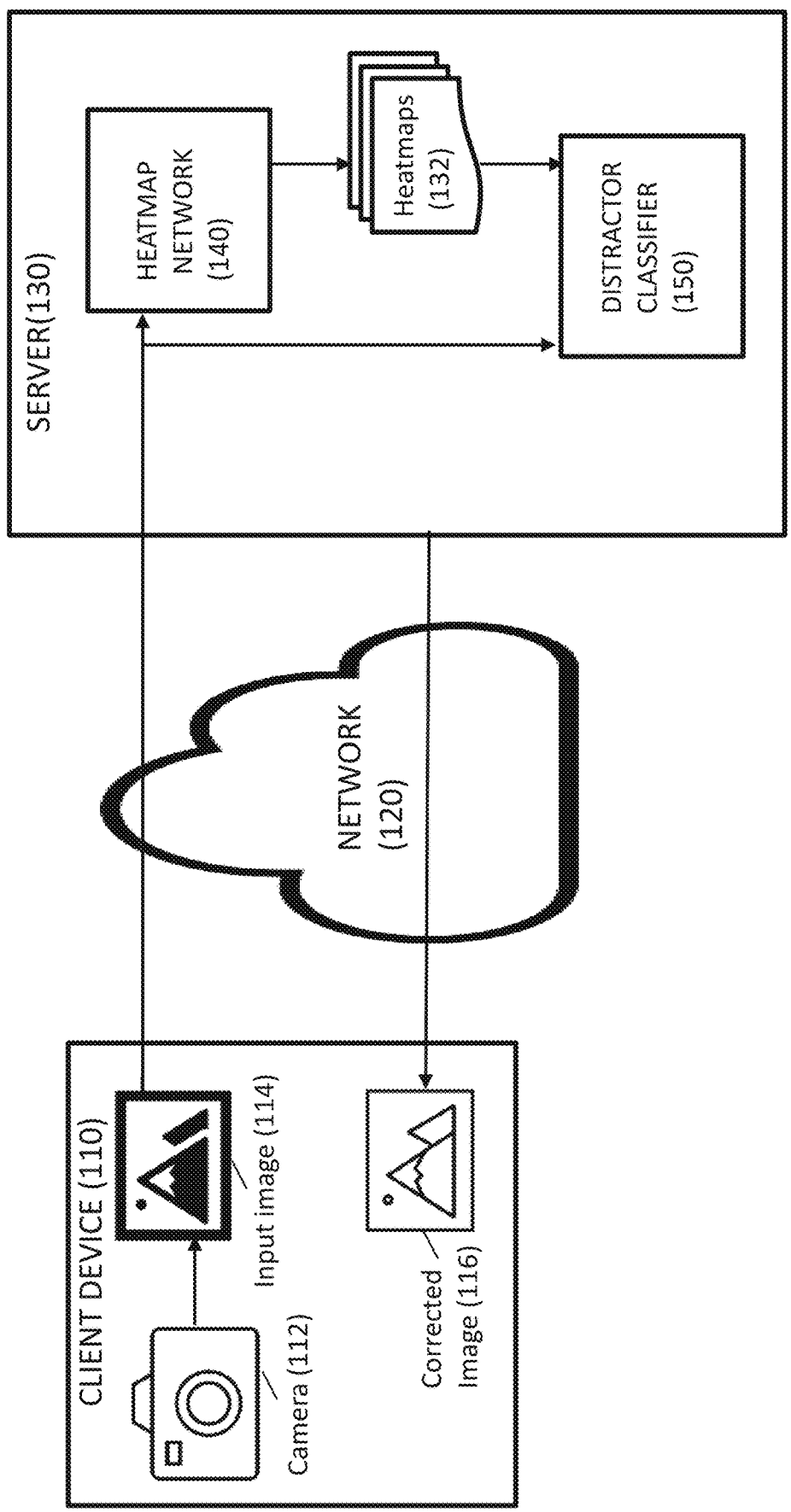
FIG. 1 is an illustration of an environment in an example implementation that is operable to employ techniques described herein.

Exemplary embodiments of the inventive concept may be implemented in a client-server environment or a client-only environment. FIG. 1 shows an example of the client-server environment, where a camera 112 of a client device 110 captures an image 114, the client device 110 sends the image 114 across a computer network 120 to a server 130, the server 130 applies the classifier to the image 114 to identify one or more distractor(s) in the image 114, the server 130 adjusts the image based on the identified distractor(s) to generate a corrected image 116, and the server 130 transmits the corrected image 116 to the client device 110.

The adjustment may include removing the identified distractor(s) or blurring a region of the image that includes the identified distractor(s). In an exemplary embodiment, a user interface of the client device 110 includes a computer program (e.g., a distractor editor) that enables a user to edit the identified distractor(s). The editing may include the above described removing, blurring, or other edits. The blurring may be an effect that removes emphasis from the finer details and instead conveys the overall nuance of the photo.

In an exemplary embodiment, the distractor is removed automatically by an editing process. An editing process such as an inpainting process may be used. For example, an inpainting process is a conservation process where damaged, deteriorated, or missing parts of an artwork or digital image are filled in to present a complete image. The conservation process may include structural (or geometric) inpainting, texture inpainting, or a combination of structural and texture inpainting.

In another example of the client-server environment, instead of the image 116 being captured by the camera 112, the image 116 is loaded from a memory accessible by the client device 110 (e.g., a secure digital (SD) card, a universal serial bus (USB) flash drive, a local memory) or received from another client device in a communication across the computer network 120 or some other network.

In an example of the client-only environment, the distractor classifier for identifying the distractor(s) is located entirely within the client device 110. In this embodiment, the client device 110 identifies the distractor(s) in the image 114. In this embodiment, the client device 110 may adjust the image 114 based on the identified distractor(s) to generate a corrected image 116. For example, an application of the client device 110 may automatically adjust the image 114 or selectively adjust the image 144 based on the identified distractor(s) and feedback from a user indicating which of the distractor(s) to edit or to maintain. The adjustment may include removing one or more of the distractors or blurring one or more of the distractors.

As shown in FIG. 1, in an exemplary embodiment of the inventive concept, the distractor classifier is a combination of two artificial neural networks: a distractor classifier 150 and a heatmap network 140.

The distractor heatmap network 140 operates on the input image 114 to generate a plurality of heatmaps 132. The heatmaps 132 may include a heatmap for the main subject of the photo, a heatmap for each distractor in the photo, and optionally a heatmap for the background.

The distractor classifier 150 operates on the input image 114 and the heatmaps 114 to identify whether one or more distractors are present in the input image 114.

Figure 2:
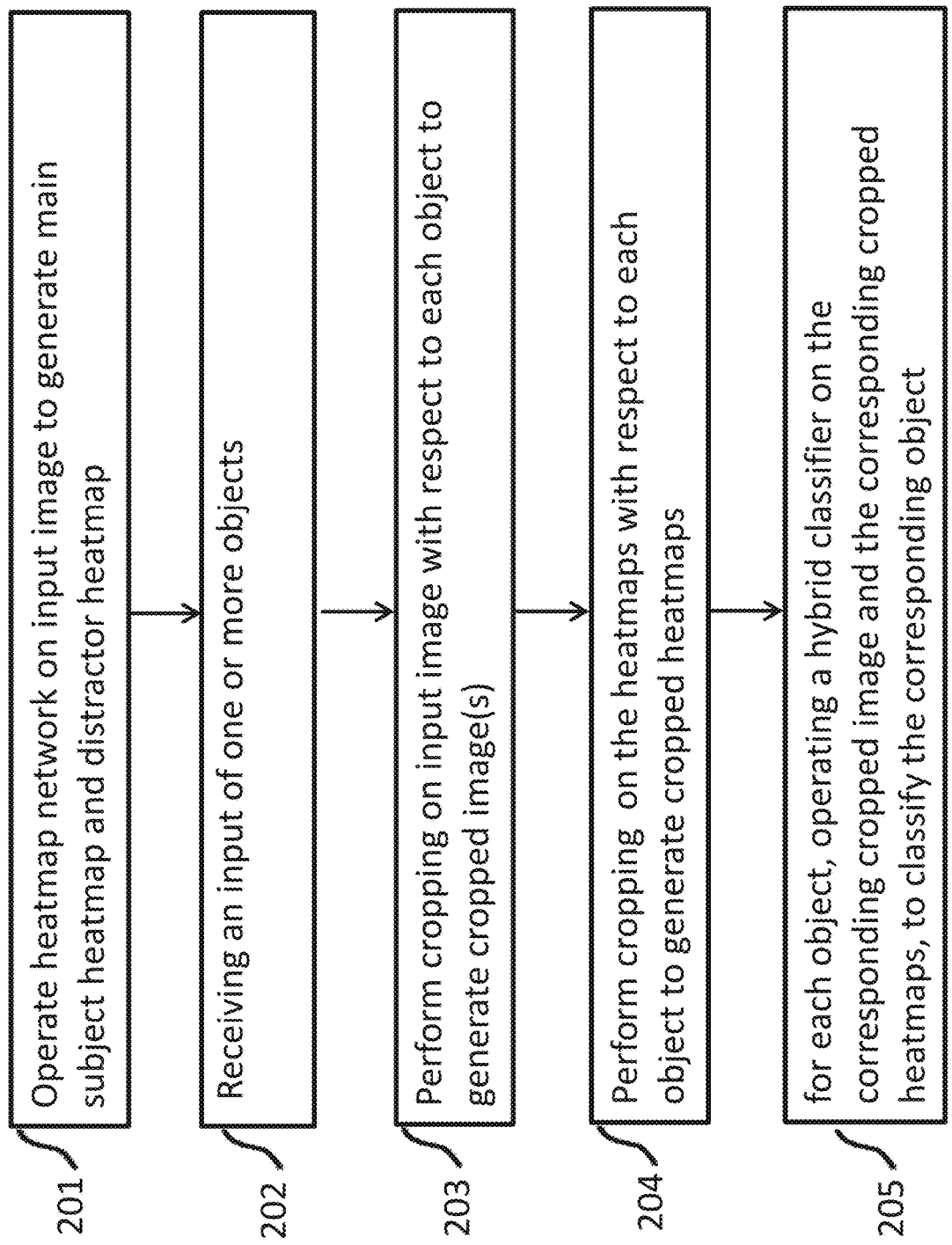
FIG. 2 illustrates a method for detecting a distractor within an image according to an exemplary embodiment of the present disclosure.

FIG. 2 illustrates a method for determining a distractor within an input image according to an exemplary embodiment of the inventive concept. The method of FIG. 2 includes operating a heatmap network on the input image to generate a main subject heatmap and a distractor heatmap (step 201); receiving an input of one or more objects (step 202); performing a cropping on the input image with respect to each object to generate cropped image(s) (step 203); cropping the heatmaps with respect to each object to generate cropped heatmaps (step 204); and for object, operating a hybrid classifier on the corresponding cropped image and the corresponding cropped heatmaps, to classify the corresponding object, as being either a main subject or a distractor (step 205). Once the distractor(s) have been identified, they can be edited or removed from the input image 114 or selectively removed based on permission or feedback from a user, to create the corrected image 116. In another embodiment, the distractor(s) can instead be blurred or selectively blurred based on permission or feedback from the user. The object(s) may be detected by an object detection classifier or by using an application on the client device 110 or the server 130 that enables the user to select portion(s) of the image 114 as the object(s). For example, the application may enable the user to draw a bounding box or other shape around portion(s) of the image to represent the object(s).

Embodiments of the disclosure are provided so that distractor(s) and main subject(s) can be more accurately recognized within an image. A prior technique for identifying distractors considers size since larger objects tend to be more salient and more likely to be the main subject. While this size assumption works for many cases, it fails to identify a distractor located between the intended subjects, and fails to identify all the main subjects when a main subject appears significantly larger than the rest of the main subjects. Thus, the prior technique may lead to instances of wrongly identifying an unwanted distractor as a main subject and wrongly identifying a main subject as a distractor. Different from this prior technique, embodiments of the inventive concept are able to correctly identify a distractor located between intended subjects and to correctly identify a main subject who appears small relative to another main subject.

As discussed above, in an exemplary embodiment, the client device 110 transmits an input image 114 across a computer network 120 to the server 130, the server 130 operates on the input image 114 to determine a distractor, the server 130 adjusts the input image 114 based on the determined distractor to generate a corrected image 116, and the server 130 transmits the corrected image 116 across the computer network 120 to the client device 110.

The computer network 120 may be wired, wireless, or both. The computer network 120 may include multiple networks, or a network of networks, but is shown in a simple form so as not to obscure aspects of the present disclosure. By way of example, the computer network 120 can include one or more wide area networks (WANs), one or more local area networks (LANs), one or more public networks, such as the Internet, and/or one or more private networks. Where the computer network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, the computer network 120 is not described in significant detail.

The client device 110 is a computing device capable of accessing the Internet, such as the World Wide Web. The client device 110 might take on a variety of forms, such as a personal computer (PC), a laptop computer, a mobile phone, a tablet computer, a wearable computer, a personal digital assistant (FDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

The client device 110 can include one or more processors, and one or more computer-readable media. The computer-readable media may include computer-readable instructions executable by the one or more processors. The instructions may correspond to one or more applications, such as software to control the camera 112, software to interface with the server 130, or software to remove a distractor from the input image 116.

The server 130 can include a plurality of computing devices configured in a networked environment, or can include a single computing device. Each server computing device can include one or more processors, and one or more computer-readable media. The computer-readable media may include computer-readable instructions executable by the one or more processors. The instructions may correspond to one or more applications, such as software to implement the person distractor heatmap network 140, software to implement the distractor classifier 150, software to remove a distractor from the input image 116 and software to interface with the client device 110.

Figure 3:
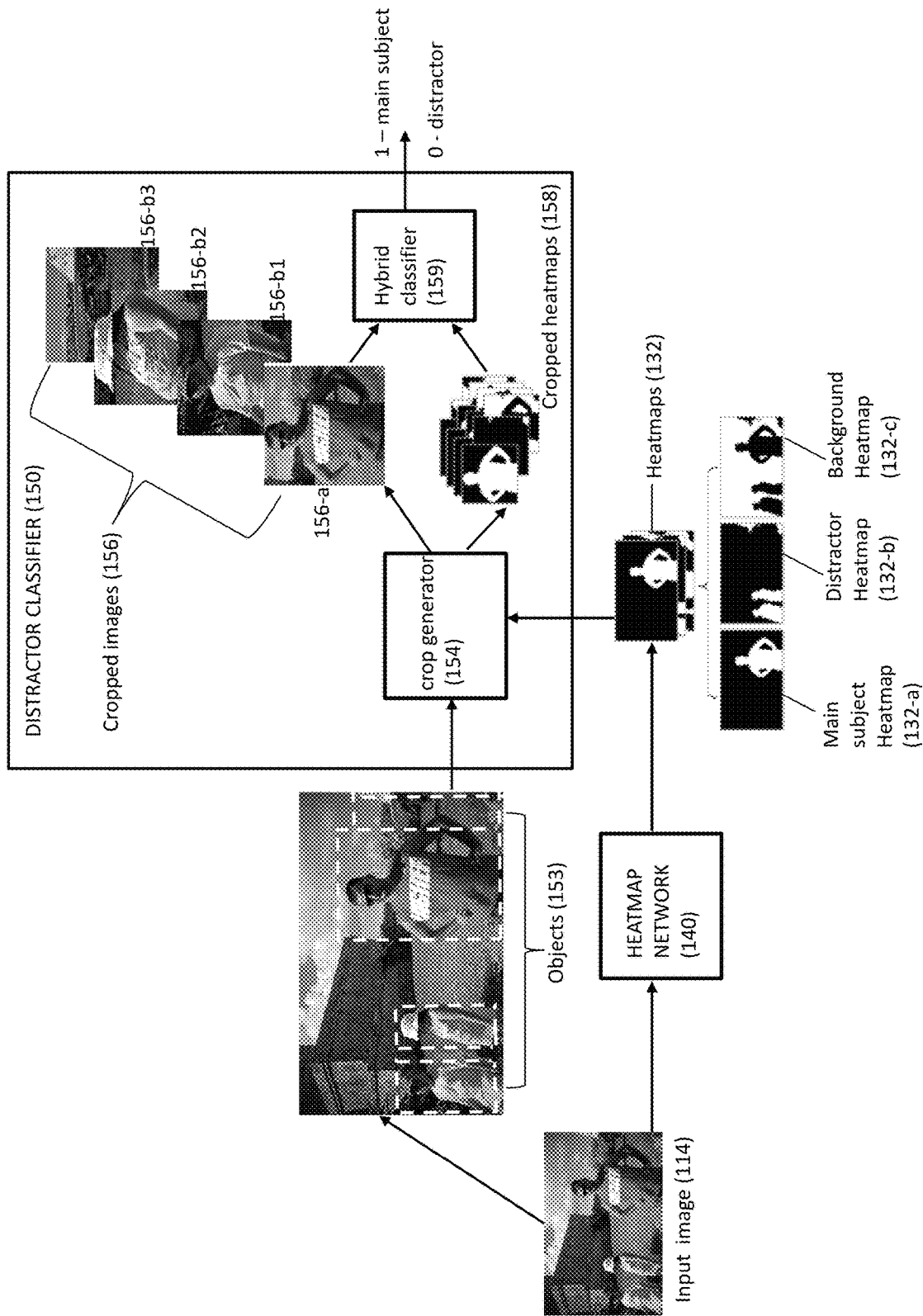
FIG. 3 illustrates a system for detecting a distractor within an image according to an exemplary embodiment of the present disclosure.

FIG. 3 illustrates the heatmap network 140 and the distractor classifier 150 of FIG. 1 in more detail according to an exemplary embodiment of the disclosure.

The heatmap network 140 operates on the input image 114 to generate a main subject heatmap 132-a representing possible main subjects and a distractor heatmap 132-b representing possible distractors (e.g., see step 201 of FIG. 2). A heatmap, also known as a class activation map, is a prediction made by a convolutional neural network that indicates a probability value on a scale of 0 to 1, that a specific pixel of an image belongs to a particular class from a set of classes. As opposed to object detection, the goal of a heatmap network is to classify individual pixels as being part of the same region. A region can be interpreted in various ways, such as areas of an image where all pixels are of the same color or brightness.

In an exemplary embodiment, the heatmap network 140 was previously trained on whole images (e.g., training images). The training images may include images where there are no distractors and just main subjects and images including both main subjects and distractors.

In an exemplary embodiment, the heatmap network 140 is trained to identify features in an image that contribute to a conclusion that a given region is more likely to be a distractor or more likely to be a main subject such as body posture and body orientation. For example, subjects with slouching postures as opposed to standing at attention postures could be considered distractors, and subjects facing away from the camera 112 as opposed to subjects facing toward the camera 112 could be considered distractors. The person distractor heatmap network 140 may consider other features in addition to body posture and body orientation such as size, intensity, color, etc. In an exemplary embodiment, the heatmap network 140 is trained using training images, where these images include a background, a main subject, and sometimes a distractor.

In an exemplary embodiment of the disclosure, the heatmap network 140 is configured to classify regions of the input image 114 as being a main subject or a distractor, and output the main subject heatmap 132-a and the distractor heatmap 132-b based on the classifications. For example, any pixel of the input image 114 that is interpreted by the heatmap network 140 as being part of a main subject could be represented as white in the main subject heatmap 132-a and any pixel in the input image 114 that is interpreted by the heatmap network 140 as not being part of a main subject could be represented as black in the main subject heatmap 132-a. For example, any pixel of the input image 114 that is interpreted by the heatmap network 140 as being part of a distractor could be represented as white in the distractor heatmap 132-b and any pixel in the input image 114 that is interpreted by the heatmap network 140 as not being part of a distractor could be represented as black in the distractor heatmap 132-b.

In alternate embodiment of the disclosure, the heatmap network 140 additionally generates a background heatmap 132-c representing a possible background. The background may correspond to areas of the input image not detected as being either part of a main subject and not detected as being part of a distractor. For example, any pixel of the input image 114 that is interpreted by the heatmap network 140 as being part of the background could be represented as white in the background heatmap 132-c and any pixel in the input image 114 that is interpreted by the heatmap network 140 as not being part of the background could be represented as black in the background heatmap 132-c.

When the background heatmap 132-c is present, the heatmaps 132 may be referred to as a three-channel heatmap, where a first channel (or a first heatmap channel) corresponds to main subject prediction(s), the second channel (or a second heatmap channel) corresponds to distractor prediction(s), and the third channel (e.g., or a third heatmap channel) corresponds to a background prediction.

The heatmaps 132 (predictions) of the heatmap network 140 serves as a prior to the distractor classifier 150, to indicate a probability that a specific region of the image 114 contains a distractor or a main subject. The heatmaps 132 may also be referred to as global information since they are determined from an analysis of the entire image.

Incorrect classifications could result if the person distractor classifier 150 were to only consider the local information. Since the local information by itself may be insufficient or ambiguous to make an accurate prediction, the person distractor classifier 150 considers both the global information that is contained in the heatmaps 132 and the local information contained in the individual objects 153. For example, if the distractor classifier 150 generates a vector including a first parameter associated with a main subject and a second parameter associated with a distractor, without considering the heatmaps 132, there may be ambiguous instances where values of the first and second parameters are either the same or so similar that it is not possible to determine with confidence whether the analyzed region is the main subject or the distractor. However, since the distractor classifier 150 additionally considers the heatmaps 132, in those ambiguous instances, the values of these parameters ends up being substantially different so that it can be determined with a high degree of confidence whether the region is the main subject or the distractor. The vector may also include a third parameter that is associated with a background, and the distractor classifier 150 may consider all these parameters together when determining overall whether the region is the main subject or the distractor.

In an exemplary embodiment, the additional information of the heatmaps 132 is utilized to generate a score for the classification of an object. If there is a person in a photo who appears to be a main subject based on the local information, but the heatmaps 132 indicates with a high probability that the object is instead a distractor e.g., score is above a certain threshold or score indicates object is likely to be a distractor), the system could conclude that the object is in fact a distractor. If the heatmaps 132 instead indicated that the object is a main subject, it would confirm the original prediction, thereby providing more confidence in the main subject detections.

The distractor classifier 150 includes 152 (e.g., an object detection component), a crop generator 154, and a hybrid classifier 159 (e.g., a classifier component). The distractor classifier receives one or more object(s) 153 that have been identified from the input image 114. For example, a user may manually annotate the input image 114 with one or more bounding boxes or other shapes to represent the object(s) 153 or an object detection network or component may be present that analyzes the input image 114 to determine the object(s) without feedback from the user. In an exemplary embodiment, each of the object detection network, the heatmap network 140, and the hybrid classifier 159 is a component of a neural network.

The object detection network performs object detection on the input image 114 to detect one or more object(s) 153. The object detection network may be implemented by an image classifier. For example, the object detection network may be configured to detect various objects such as people or faces within the input image 114, where each detected person or face corresponds to one of the objects 153.

In an exemplary embodiment, the object detection network was previously trained using training data images that were marked (or annotated) by a subject matter expert to indicate which regions are people or main subjects. For example, the subject matter expert could have drawn a bounding shape such as a box, a circle, or some other non-regular shape around each region of the training image he/she deems to be a human being or a main subject.

A current one of the annotated training images can be processed through a segmentation neural network or an image segmentation algorithm to generate a mask for each bounding shape (e.g., an object mask) within the current training image. Image segmentation is the process of partitioning a digital image into multiple segments (sets of pixels). Examples of the segmentation neural network include a convolutional neural network (CNN) and a fully convolutional neural network (FCN). Examples of the image segmentation algorithm include thresholding methods such as the maximum entropy method, balanced histogram thresholding, Otsu's method, and k-means clustering. A single mask can then be created from the union of the generated object masks of the current training image, and then the object detection network can be trained using the single mask. The image segmentation, object mask generation, and single mask generation can be repeated for each of the remaining annotated training images to complete the training of the object detection network. The masks applied to the object detection network may serve as ground truths for training. Once trained, the object detection network is configured to infer one or more of the bounding regions from a newly input image that has not been annotated like the training images. The inferred bounding region includes coordinates or locations within the input image 114 that bounds a given detected object.

In an alternate embodiment, the object detection network is omitted, and an external device or program generates the object(s), and the distractor classifier 150 receives the object(s) as an input. For example, the distractor classifier 150 could load the object(s) 153 of an input image 114 from a memory located within the server 130, or from an external memory that is accessible to the server 130 through the computer network 120.

The crop generator 154 crops the input image 114 based on the locations of each of the objects 153 to generate cropped images 156. For example, if there are three object detections in the input image, then three cropped images would be generated, namely one for each of the object detections. For example, cropping an input image based on a given object detection could be performed by removing all pixels of the input image outside the locations of the corresponding inferred bounding region.

The input image 114 shown in FIG. 1 includes a pair of distractors in the lower left corner, a single distractor on the right edge, and a main or intended subject between the pair of distractors. The objects 153 may include a first detected object for the main subject and second through fourth detected objects for the distractors. However, at this stage, the distractor classifier 150 does not have sufficient information to determine whether the first detected object is in fact a main subject or whether the second through fourth detected objects are distractors.

The cropped images 156 includes a first cropped image 156-a of the first detected object created by cropping the input image 114 with respect to the first detected object, a second cropped image 156-b1 of the second detected object created by cropping the input image 114 with respect to the second detected object, a third cropped image 156-b2 of the third detected object created by cropping the input image 114 with respect to the third detected object, and a fourth cropped image 156-b3 of the fourth detected object created by cropping the input image 114 with respect to the fourth detected object.

The crop generator 154 also crops the heatmaps 132 with respect to each of the detected objects 132 to generate cropped heatmaps 158. The heatmaps 132 include a single main subject heatmap 132-a, a single distractor heatmap 132-b, and optionally a background heatmap 132-c. In the above example, since four objects were detected, and there are three heatmaps, the cropping results in 3 cropped heatmaps for each detected object or a total of 12 cropped heatmaps.

A first region within the main subject heatmap 132-a corresponding to a first location of the first detected object within the input image 114 represents a first cropped heatmap, a first region within the distractor heatmap 132-a corresponding to the first location represents a second cropped heatmap, a third region within the background heatmap 132-c corresponding to the first location represents a third cropped heatmap.

A second region within the main subject heatmap 132-a corresponding to a second location of the second detected object within the input mage 114 represents a fourth cropped heatmap, a second region within the distractor heatmap 132-a corresponding to the second location represents a fifth cropped heatmap, a second region within the background heatmap 132-c corresponding to the second location represents a sixth cropped heatmap.

A third region within the main subject heatmap 132-a corresponding to a third location of the third detected object within the image 114 represents a seventh cropped heatmap, a third region within the distractor heatmap 132-a corresponding to the third location represents an eighth cropped heatmap, and a third region within the background heatmap 132-c corresponding to the third location represents a ninth cropped heatmap.

A fourth region within the main subject heatmap 132-a corresponding to a fourth location of the fourth detected object within the image 114 represents a tenth cropped heatmap, a fourth region within the distractor heatmap 132-a corresponding to the fourth location represents an eleventh cropped heatmap, and a fourth region within the background heatmap 132-c corresponding to the fourth location represents a twelfth cropped heatmap.

For each of the objects 153, the hybrid classifier 159 operates on a corresponding cropped image (e.g., its features) among the cropped images 156 and corresponding heatmaps (e.g., their features) to determine whether each of the objects 153 is a main subject or a distractor. For example, the hybrid classifier 159 may perform an operation on the first cropped image 156-a associated with the first object detection and the corresponding first cropped heatmap (i.e., derived from 132-a and the location of the first object detection), second cropped heatmap (i.e., derived cropped from 132-b and the location of the first object detection), and third cropped heatmap (i.e., derived from 132-c and the location of the first object detection) to determine whether the first detected object is a main subject or a distractor. The hybrid classifier 159 may repeat this operation for the rest of the objects to determine whether the remaining objects are considered to be a main subject or a distractor. In an exemplary embodiment, the features of the cropped image associated with a given object is concatenated or appended with features of the cropped heatmaps derived from the given object and fed to the hybrid classifier 159. The classifier 159 is referred to as a hybrid classifier because it is configured to handle both the cropped images 156 (e.g., location information from the object detections 153) and the cropped heatmaps 158 (e.g., derived from the global information of the heatmaps 132) to produce a final binary decision about a given object within the image 114.

Once the distractor(s) have been identified, the server 130 can automatically adjust the input image 114 or selectively adjust the input image 114 based on permission from a user of the client device 110, to create the corrected image 116. For example, the server 130 can transmit a message (or a query) over the computer network 120 that identifies the input image, identify the objects interpreted as distractors, and request permission to adjust the input image 114 using one or more of the identified distractors. For example, the message could include boundary coordinates of each of the distractors. A user interface of the client device 110 can then highlight a region (or change all pixels of the region to a same color) of the input image 114 corresponding to the boundary coordinates and query the user to indicate whether to delete/blur or keep the highlighted distractor. The client device 110 may repeat this process for each of the distractors, and then update the input image 114 to remove any of the distractors the user indicated should be deleted or to blur any of the distractors the user indicated should be blurred. Alternately, the client device 110 can inform the server 130 of the distractors the user desires to delete/blur, and then the server 130 can perform the corresponding deletion/blurr(s) to generate the corrected image 116. In an exemplary embodiment, a user interface of the client device 110 is configured to enable a user to send a message back to the server 130 as a response to the query informing the server 130 to edit the input image 114 or to make no edits to the input image 114.

Figure 4:
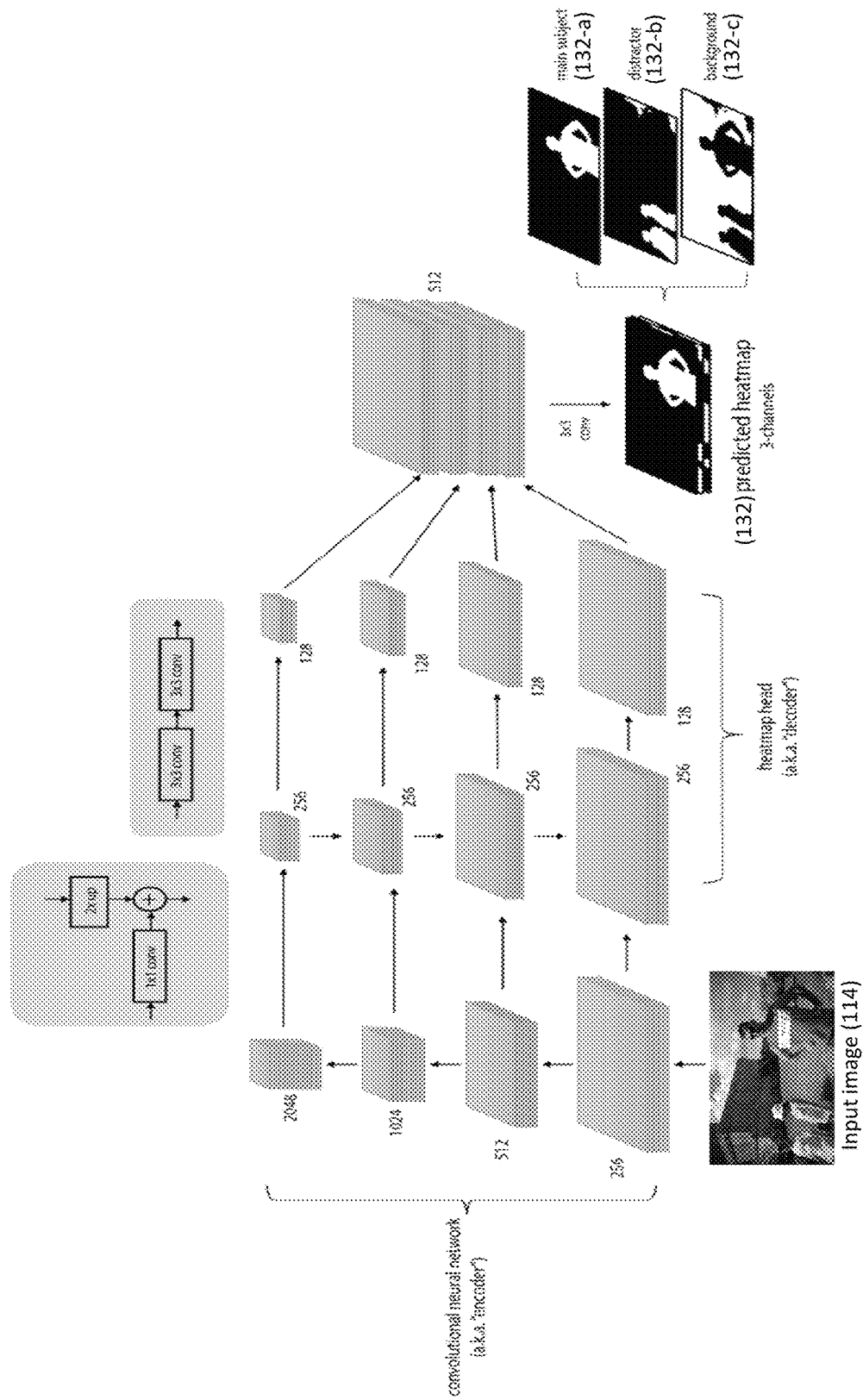
FIG. 4 illustrates a heatmap network of the system according to an exemplary embodiment of the present disclosure.

FIG. 4 shows the heatmap network 140 according to an exemplary embodiment of the disclosure. Referring to FIG. 4, the heatmap network 140 includes a pre-trained deep residual network (e.g., a ResNet-50) as its convolutional feature extraction network (e.g., convolutional neural network or encoder) with a feature pyramid network (e.g., a heatmap head or encoder). In an exemplary embodiment, the heatmap network 140 uses a SoftMax activation function for N-class classification with a Dice Loss, for training. In an embodiment, a mean intersection over union (IoU) score is used to evaluate performance of a model of the heatmap network 140. The object detection network may use a separate, pre-trained ResNet-50 network as its feature encoder.

Figure 5:
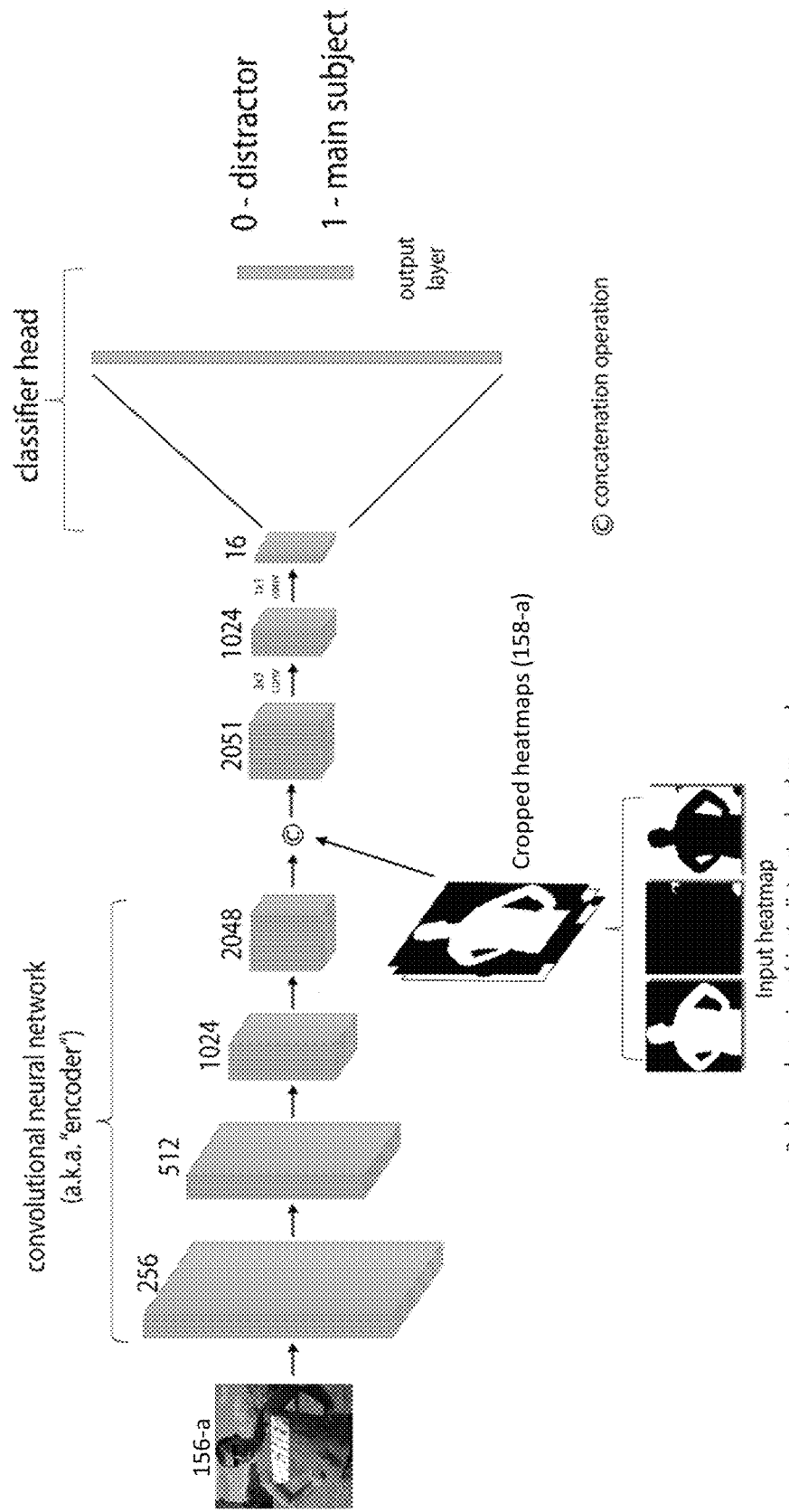
FIG. 5 illustrates a hybrid classifier of the system according to an exemplary embodiment of the present disclosure.

FIG. 5 shows the hybrid classifier 159 according to an exemplary embodiment of the disclosure. Referring to FIG. 5, features of a cropped image (e.g., 156-*a*) associated with a given object is input to a convolutional neural network of the hybrid classifier 159 and features of the cropped heatmaps (e.g., 158-*a*) associated with the given object are input to a first internal layer of the classifier 159 to output a binary value indicating whether the given object detection is a distractor (e.g., 0) or a main subject (e.g., 1). The output of a second internal layer of the classifier 159 before the first internal layer may be concatenated to the features of the cropped heatmaps using a concatenation operation to result in a feature map that is output to the first internal layer. For example, the feature map in FIG. 5 includes 2048+N channels, where the N channels correspond to the output of the heatmap network 140 and the 2048 channels correspond to the features or feature maps output by the second internal layer. Use of 2048 channels is merely an example, as the second internal layer may be configured to output less than or more than 2048 channels in alternate embodiments. For example, N=3 when all three heatmaps 132-*a*, 132-*b*, and 132-*c* are used. As shown in FIG. 5, a 3×3 convolution may be performed on the output of the first internal layer to reduce the channel depth from 2048+N channels to 1024 channels, and then a 1-1 convolution can be performed to further reduce the depth of the feature map from 1024 channels to 16 channels. An average pooling may be applied to the 16 channels before a binary classification head. For example, if the 16 channels represent 16 different numbers, these numbers may be averaged together to generate an average value. In an exemplary embodiment, when the average value is above a certain threshold, the object is considered to be a distractor and the hybrid classifier 159 outputs a first binary value (e.g., 0), and otherwise the object is considered to be a main subject and the hybrid classifier 159 outputs a second other binary value (e.g., a 1). In an another exemplary embodiment, when the average value is above a certain threshold, the object is considered to be a main subject and the hybrid classifier 159 outputs the second binary value, and otherwise the object is considered to be a distractor and the hybrid classifier 159 outputs the first binary value.

The hybrid classifier 159 may be trained using an average Cross Entropy Loss. A mean accuracy score may be used to evaluate performance of the hybrid classifier 159. In an alternate embodiment, the features of a cropped image and the cropped heatmaps are both applied to the input layer of the hybrid classifier 159.

Various embodiments of the present technology provide for a wide range of technical effects, advantages, and/or improvements to computing systems and components. For example, various embodiments include one or more of the following technical effects, advantages, and/or improvements: 1) automatic detection of distractors (e.g., people, animals, inanimate objects, etc.) in a photo; 2) automatic and selective removal of distractors in a photo; 3) improved detection of distractors located between main subjects in a photo; 4) improved detection of distractors in a photo of a crowded place; 5) improved detection of distractors that appear larger than the main subject in a photo; 5) reduction in mischaracterizations of the main subject in a photo as a distractor; and 6) more accurate detection of main subjects.

Aspects and implementations of a human distractor classifier and image correction using the human distractor classifier of the disclosure have been described in the general context of various steps and operations. A variety of these steps and operations are performed by hardware components or are embodied in computer-executable instructions, which cause a general-purpose or special-purpose processor (e.g., in a computer, server, or other computing device) programmed with the instructions to perform the steps or operations. For example, the steps or operations are performed by a combination of hardware, software, and/or firmware.

Figure 6:
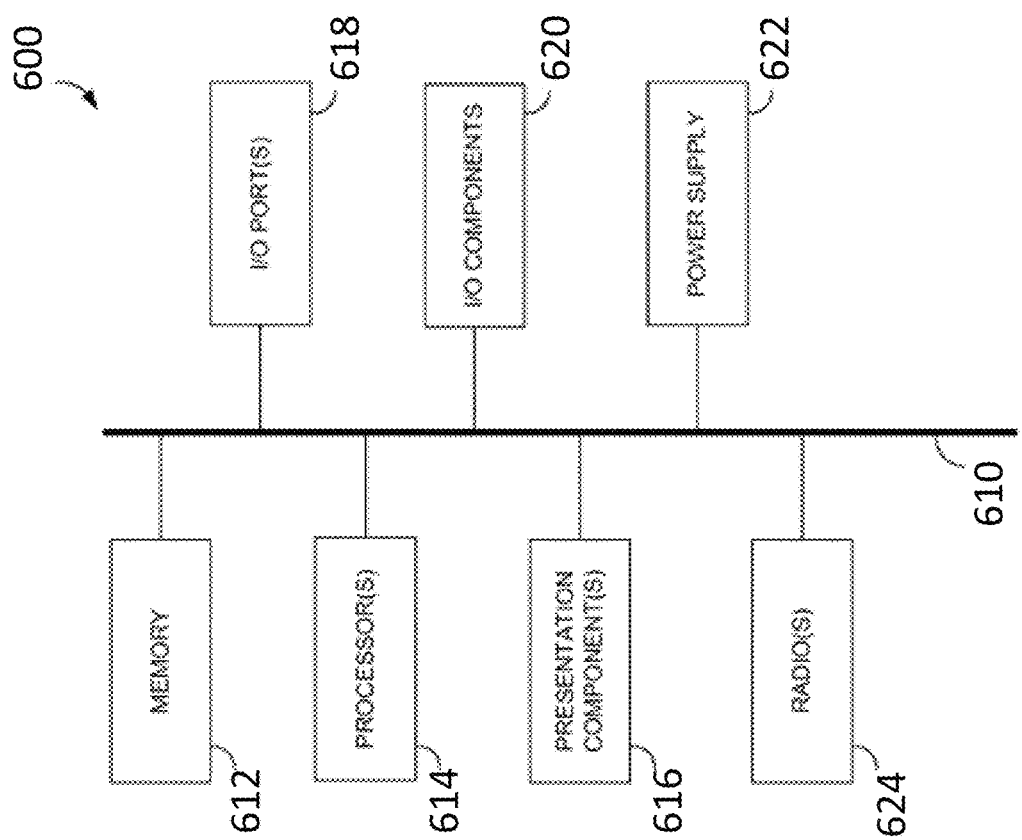
FIG. 6 is a block diagram of an exemplary computing environment suitable for use in implementations of the present disclosure.

Having described implementations of the present disclosure, an exemplary operating environment in which embodiments of the present invention may be implemented is described below to provide a general context for various aspects of the present disclosure. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device, Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). For example, one may consider a presentation component such as a display device to be an I/O component. The diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term modulated data signal means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. For example, the person distractor heatmap network 140, the heatmaps 132, and the person distractor classifier 150 may be stored in the memory 612 when the server 130 is implemented by computing device 600. The computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 avow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition.

At least one embodiment of the disclosure provides a method for identifying a distractor in an image by concatenating features of an object cropped from the object with features of a cropped heatmap of the image, and predicting whether the object is the distractor by using a neural network to process the concatenated features. In an embodiment, the neural network is trained with a plurality of training images, where some of the training images include both a main subject and a distractor object, and some of the training images only include a main subject. The features of the object cropped from the image include first data local to the object and the heatmap of the image includes second data global to the image. In an embodiment, the first data local to the object is generated from pixels of the object and the second data global to the image is generated from all pixels of the image. The heatmap of the image may include a first heatmap of pixels corresponding to a main subject, a second heatmap of pixels corresponding to a distractor, and a third heatmap of pixels corresponding to a background.

At least one embodiment of the disclosure includes provides an apparatus including an object detection network, a heatmap network, and a hybrid classifier. The object detection network is configured to detect objects within an image. The heatmap network is configured to generate a global heatmap of the image including a heatmap of pixels that corresponds to a distracting object within the image. The hybrid classifier is configured to identify the distracting object based on the detected objects and the global heatmap. In an exemplary embodiment, the object detection network generates a bounding box for each detected object and generates a cropped image based on the bounding box. In an exemplary embodiment, the apparatus includes an editor configured to edit the distracting object identified by the hybrid classifier.

At least one embodiment of the disclosure includes a computing system identifying a distractor within an image. The computing system includes a memory storing an application and a neural network and a processor configured to execute the application. The application receives an input image from a client device across a computer network, determines an object within the input image, generates a heatmap from the input image, crops the object and the heatmap to generate a cropped image and a cropped heatmap, and applies features of the cropped image concatenated with the cropped heatmap to the neural network to predict whether the object is a distractor. In an embodiment, the application provides a query across the computer network to a user to request permission to edit the input image when the object is predicted to be the distractor. In an embodiment, the application is configured to prompt the client device to input a bounding box around the object in the image to be identified, and the cropped image is cropped from the object in the bounding box.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A method for identifying a distractor in an image, comprising:
    operating a heatmap network on the entire image to generate a heatmap;
    determining features of a cropped image, wherein the cropped image is smaller than the entire image and is a cropping of the image with respect to an object within the image;
    cropping the heatmap with respect to the object to generate a cropped heatmap smaller than the entire heatmap;
    concatenating the features of the cropped image with features of the cropped heatmap to generate concatenated features; and
    inputting the concatenated features to a neural network to predict whether the object is the distractor in the image.

2. The method of claim 1, wherein the heatmap of the image includes a first heatmap of pixels corresponding to a main subject and a second heatmap of pixels corresponding to the distractor.

3. The method of claim 2, wherein the heatmap of the image further includes a third heatmap of pixels corresponding to a background.

4. The method of claim 1, wherein the cropped heatmap corresponds to the object by image location.

5. The method of claim 1, wherein the neural network is trained with a plurality of images, wherein each image of more than one of the plurality of images includes a main subject and a distractor object.

6. The method of claim 1, wherein the neural network comprises an object detection component, a heatmap component, and a classifier component, wherein features of the object cropped from the image are generated by the object detection component, the heatmap is generated by the heatmap component, and the classifier component predicts whether the object is the distractor.

7. The method of claim 1, wherein the heatmap of the image is generated by a heatmap component trained with a plurality of images, each of at least two images having a main subject, a distractor object, and a background.

8. An apparatus comprising:
    an object detection network configured to detect objects within an input image;
    a heatmap network configured to generate a global heatmap of the entire input image including a heatmap of pixels;
    a hybrid classifier configured to identify a distracting object based on at least one of the detected objects and the global heatmap; and
    a processor configured to apply the input image to the object detection network to detect one of the objects within the input image, determine features of a cropped image smaller than the entire input image that is a cropping of the input image with respect to the one object within the image, apply the input image to the heatmap network to generate the global heatmap, crop the global heatmap with respect to the one object to generate a cropped heatmap smaller than the entire heatmap, concatenate the features of the cropped image and features of the cropped heatmap to generate concatenated features, and apply the concatenated features to the hybrid classifier to determine whether the one object is the distracting object within the input image.

9. The apparatus of claim 8, wherein the object detection network generates a bounding box for each detected object and generates the cropped image based on the bounding box.

10. The apparatus of claim 9, wherein the object detection network generates the features of the cropped image having data local to the cropped image.

11. The apparatus of claim 8, wherein the heatmap network generates a first heatmap channel indicating pixels that correspond to the distractor object and a second heatmap channel indicating pixels that correspond to a main subject.

12. The apparatus of claim 11, wherein the heatmap network generates a third heatmap channel indicating pixels that correspond to a background of the input image.

13. The apparatus of claim 8, further including a distractor editor configured to edit the distracting object identified by the hybrid classifier.

14. The apparatus of claim 8, wherein each of the object detection network, the heatmap network, and the hybrid classifier is a component of a neural network.

15. The apparatus of claim 8, wherein for each detected object, the hybrid classifier operates on a combination of features of the detected object and features of the global heatmap, to determine whether the detected object is the distractor object.

16. The apparatus of claim 15, wherein the features of the detected object are cropped from the input image and generated by a convolutional neural network.

17. A computing system for identifying a distractor within an image, comprising:
    a memory storing an application and a neural network; and
    a processor configured to execute the application,
    wherein the application is configured to receive an input image from a client device across a computer network, determine an object within the input image, generate a heatmap from the entire input image, determine features of a cropped image smaller than the entire input image that is a cropping of the input image with respect to the object, crop the heatmap with respect to the object to generate a cropped heatmap smaller than the entire heatmap, concatenate the features of the cropped image and features of the heatmap to generate concatenated features, and apply the concatenated features to the neural network to predict whether the object is the distractor in the input image.

18. The computing system of claim 17, wherein the application is configured to provide results indicating whether the object is the distractor in the input image across the computer network to a client application of the client device and the client application requests permission from a user of the client device to edit the input image based on the results.

19. The computing system of claim 17, wherein the application is configured to prompt the client device to input a bounding box around the object in the input image to be identified, and the cropped image is cropped from the object in the bounding box.

* * * * *